United States Patent [19]

Kneringer et al.

[11] Patent Number: 4,990,402
[45] Date of Patent: Feb. 5, 1991

[54] PROCESS FOR THE MANUFACTURE OF A SOLDERED JOINT

[75] Inventors: Gunther Kneringer, Reutte; Nikolaus Reheis, Jerzens; Walter Thalman, Breitenwang, all of Austria

[73] Assignee: Schwarzkopf Development Corporation, New York, N.Y.

[21] Appl. No.: 387,708

[22] Filed: Jul. 31, 1989

[30] Foreign Application Priority Data

Aug. 1, 1988 [AT] Austria .................................. 1937/88

[51] Int. Cl.⁵ ............................................. B32B 15/14
[52] U.S. Cl. .................................... 428/408; 228/122; 228/263.12; 428/457; 428/689; 428/697
[58] Field of Search .................... 228/121, 122, 263.12, 228/263.11, 109; 428/408, 457, 688, 689, 697

[56] References Cited

U.S. PATENT DOCUMENTS

| | | | |
|---|---|---|---|
| 3,713,790 | 1/1973 | Takamon et al. | 428/408 |
| 3,898,729 | 8/1975 | Greene | 228/122 |
| 3,991,248 | 11/1976 | Bauer | 428/408 |
| 4,075,364 | 2/1978 | Panzeara | 228/122 |
| 4,338,380 | 7/1982 | Erickson et al. | 228/122 |
| 4,358,046 | 11/1982 | Detz et al. | 428/408 |
| 4,396,663 | 8/1983 | Mitchell et al. | 428/408 |
| 4,396,677 | 8/1983 | Intrater et al. | 428/408 |
| 4,398,659 | 8/1983 | Richter | 228/121 |
| 4,529,836 | 7/1985 | Powers et al. | 228/122 |
| 4,621,761 | 11/1986 | Hammond et al. | 228/263.12 |
| 4,630,767 | 12/1986 | Mizuhara | 228/263.12 |
| 4,645,068 | 2/1987 | Partz | 228/122 |
| 4,645,121 | 2/1987 | Devine, Jr. | 228/263.12 |
| 4,698,271 | 10/1987 | Moorhead | 228/122 |
| 4,700,882 | 10/1987 | Devine, Jr. | 228/263.12 |
| 4,817,853 | 4/1989 | Scanlon et al. | 228/121 |
| 4,907,733 | 3/1990 | Pratt et al. | 228/122 |

FOREIGN PATENT DOCUMENTS

| | | |
|---|---|---|
| 1558902 | 7/1967 | Fed. Rep. of Germany . |
| 2759148 | 12/1977 | Fed. Rep. of Germany . |
| 242767 | 11/1985 | German Democratic Rep. . |

Primary Examiner—Patrick J. Ryan
Assistant Examiner—Archene A. Turner
Attorney, Agent, or Firm—Morgan & Finnegan

[57] ABSTRACT

The invention relates to a process for the manufacture of a solder joint between a part consisting of pyrolytic graphite and a metal part. According to the invention, the parts are not soldered directly to each other, but by way of an intermediate piece consisting of graphite reinforced with carbon fiber. In the process, pyrolytic graphite and carbon-fiber reinforced graphite are positioned in relation to each other in such a way that the stratification of pyrolytic graphite runs approximately parallel to the place of primary orientation of carbon fibers within the carbon-fiber reinforced graphite.

11 Claims, 1 Drawing Sheet

PROCESS FOR THE MANUFACTURE OF A SOLDERED JOINT

BACKGROUND OF THE INVENTION

1. Field of Invention

The invention relates to a process for the manufacture of a soldered joint between a part made of pyrolytic graphite and a metal part. The invention further relates to a process for soldering pyrolytic graphite and metal parts and the soldered product produced thereby.

2. Description of Related Art

Because of its special properties, such as high thermal resistance, elevated heat conduction capacity and modest pulverizing rate, graphite is well suited as a thermal shield, among other things. At the same time, however, graphite possesses limited mechanical strength and modest ductility, so that in special applications it is only used as a material bonded with metals.

To this end, there are known processes in which polycrystalline graphite is soldered to suitable metallic materials, such as for example copper, inconel, molybdenum or a molybdenum alloy such as TZM which is a high temperature molybdenum alloy comprising 0.5% Ti, 0.08 Zr, 0.01–0.04% C and the balance molybdenum. Suitable solders include for example alloys of the elements Ag, Cu, Ni, Pd, Ti, Zr, Cr with portions of copper and titanium. Soldering takes place under vacuum, at temperatures between 850° C. and 1900° C., depending on the composition of the solder. Such bonded materials have proved valuable for example in the manufacture of structural components of the "first wall" or diverters and limiters in fusion reactions.

A graphite material featuring substantially superior properties compared to polycrystalline graphite, in terms of thermal resistance, heat conduction and a limited pulverization rate, is pyrolytic graphite. Pyrolytic graphite is produced by precipitation from a gaseous phase, whereby an orientation occurs of the atomic and/or crystallographic layers. The stratification of the pyrolytic graphite results in anisotropic properties, in contrast to polycrystalline graphite which possesses isotropic properties. Special after-treatment methods, such as annealing or simultaneous annealing and pressure application, result in the production of different qualities, such as annealed, and compression annealed, with slight differences in the individual characteristics.

Thus, compared to polycrystalline graphite, pyrolytic graphite exhibits substantially improved heat conduction, paralleling its stratification. At the same time, mechanical strength in this direction is very high, while thermal elongation is very modest. Conversely, heat conductivity and mechanical strength perpendicular to the stratification are limited, while thermal expansion is high.

Based on these special properties, it is difficult to solder pyrolytic graphite with metals which, as a rule, display isotropic properties.

Soldering processes which have proved valuable in soldering polycrystalline graphite with metals are not suited to the production of a satisfactory joint between pyrolytic graphite and metals. Above all, the use of such soldering processes leads to inadmissible cracks in the pyrolytic graphite, extending both parallel and perpendicular to its laminar strata.

SUMMARY OF THE INVENTION

A process for soldering a pyrolytic graphite part and a metal part, wherein the parts are not soldered directly to each other, but feature an intermediate part made of carbon fiber-reinforced graphite, whereby the pyrolytic graphite part and the carbon fiber-reinforced graphite are arranged in relation to each other so that the layers of the pyrolytic graphite part run parallel to the primary plane of orientation of carbon fibers in the carbon fiber reinforced graphite part.

The parts may be soldered together, layered one on top of the other with an intermediate solder film comprised of an alloy of 70% silver, 27% copper and 3% titanuim, and soldered together under vacuum at a temperature of about 850° C.

DETAILED DESCRIPTION OF THE INVENTION

The task of this invention is to find a process for the manufacture of a soldered joint between pyrolytic graphite and metal parts, in which the resultant solder bond meets all thermal and mechanical requirements and is free of the occurrence of crack fissures in pyrolytic graphite. According to the invention, this is accomplished by not joining the pyrolytic graphite part and metal part together directly, but instead by using an intermediate part comprised of a carbon fiber-reinforced graphite, whereby the pyrolytic graphite part and such carbon-fiber reinforced graphite part are positioned in relation to each other so that the stratification of the pyrolytic graphite part is approximately parallel to the primary orientation plane of the carbon fibers in the carbon-fiber reinforced graphite part.

In the case of the carbon-fiber reinforced graphite part, the graphite fibers are as a rule irregularly arrayed in individual layers and the latter are arranged in superimposed layers, thereby offering little interlinking. Carbon is introduced between the fibers according to one of several known processes, and is solidified with the fibers.

Compared to many other graphite materials, these compounds possess elevated thermal conductivity, high mechanical strength and good vacuum tightness. Like pyrolytic graphite, carbon-fiber-reinforced graphite is a material having anisotropic properties, wherein a given orientation of the carbon fibers in the graphite yields a preferred orientation suitable to special properties. The invented arrangement of pyrolytic graphite and carbon fiber-reinforced graphite achieves equidirectional preferred orientation of the two materials and at the same time has good thermal conduction and limited heat elongation properties. The thickness of components made of carbon fiber-reinforced graphite must be selectively chosen so as to avoid cracks in the carbon fiber-reinforced graphite caused by mechanical stresses occasioned by temperature gradients within the joint. The requisite thickness is a function of the dimensions of the soldering surface.

In a particularly advantageous process, the parts to be soldered are laminated one above the other, with an intermediate layer comprised of a solder foil made of an alloy containing 70% by weight silver, 27% by weight copper and 3% by weight titanium, soldered together under vacuum at a temperature of approximately 850° C.

Figure 1:
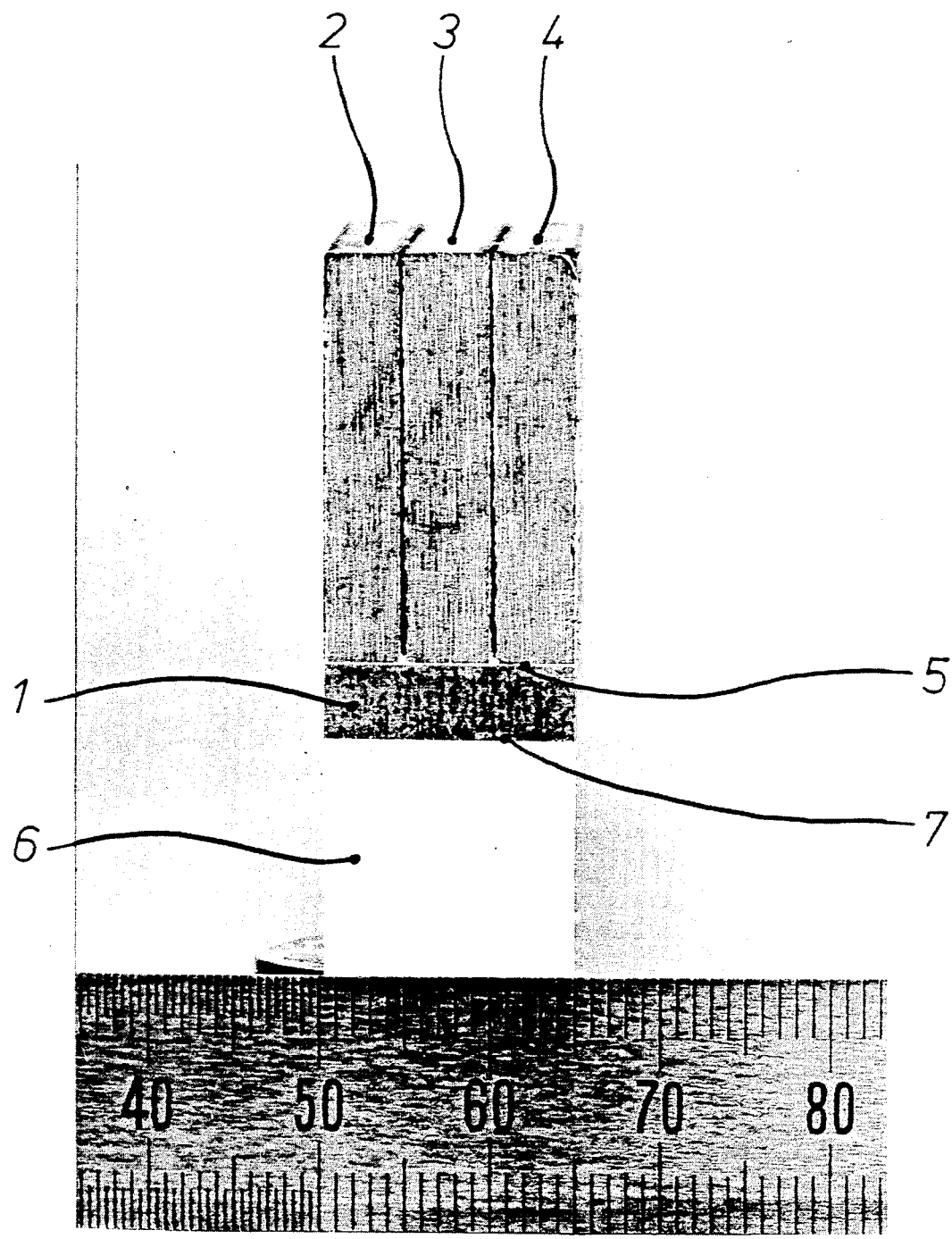
FIG. 1 is a photo of a specimen magnified about 2.5 X. Part 1 is a carbon fiber-reinforced graphite part, parts 2 to 4 are pyrolytic graphite components spaced slightly apart from each other. Part 6 is made of TZM. The solder layer 5 joins parts 2, 3 and 4 of pyrolytic graphite with part 1 of carbon fiber-reinforced graphite. The solder layer 7 joins part 1 to part 6 made of TZM.

The following example will illustrate the invention in greater detail.

EXAMPLE 1

In order to produce a sample solder, three parts of a pyrolytic graphite measuring 70×50×5 mm spaced 0.25 mm apart with an intermediate part comprised of carbon fiber-reinforced graphite were soldered to a part comprised of TZM and measuring 15×50×15 mm. In the process, the constituents made of pyrolytic graphite were arranged to afford the greatest possible heat conduction in the direction of the TZM component. In other words, their layers ran perpendicular to the soldering location.

For the carbon-fiber reinforced graphite part, a special grade made by the firm of Carbon Lorraine and known as 'randomly distributed quality' was utilized. In this particularly advantageous quality, short carbon fibers featuring at the outset a random orientation are compressed and impregnated with pure carbon by a CVD (chemical vapor deposition) process. A certain orientation of the fibers is achieved by pressing the carbon fibers, so that in this special carbon fiber-reinforced graphite, the primary orientation plane of the fibers runs perpendicular to the compressing direction.

For soldering purposes, a solder film 0.1 mm in thickness and comprised of 70% by weight silver, 27% by weight copper and 3% by weight titanium was placed upon the TZM part. On top was placed a part made of carbon fiber-reinforced graphite in randomly distributed quality, with a thickness of 10 mm, in such a way that the plane of primary orientation of the fibers ran parallel to the stratified parts comprised of the pyrolytic graphite. On top of this, in turn, was placed a solder foil 0.1 mm thick, comprised of 70% by weight silver, 27% by weight copper and 3% by weight titanium. Next, the parts consisting of pyrolytic graphite were superimposed. The array was placed into a high-vacuum soldering oven. The oven was pumped down to a vacuum of $10^{-5}$ mbar and heated for 30 minutes to 860° C. It was held at this temperature for five minutes, after which the oven was cooled down for two hours under vacuum.

The specimen exhibited an exceptional solder joint and no graphite fissures were detectable on the electron microscope grid.

For further evaluation, the samples were placed under vacuum between $10^{-1}$ and $10^{-3}$ Pascal and heated as evenly as possible in ten consecutive cycles from 200° to 70° C. within 3 minutes, and then once again cooled down to 200° C. inside of 17 minutes. The samples were then re-examined under an electron microscope. Neither the solder joint nor any adjacent areas of the material displayed any defects or cracks.

What is claimed is:

1. A soldered product comprised of:
   (a) a pyrolytic graphite part;
   (b) a first solder film positioned on said pyrolytic graphite part;
   (c) a carbon-fiber-reinforced graphite part positioned on top of said first solder film;
   (d) a second solder film positioned on said carbon fiber-reinforced graphite part; and
   (e) a metal part positioned on top of said second solder film, wherein stratification of said pyrolytic graphite part runs parallel to the plane of primary orientation of carbon fibers within said carbon fiber reinforced graphite part.

2. A soldered product according to claim 1, wherein said first solder film is comprised of an alloy of 70% silver, 27% copper and 3% titanium.

3. A soldered product according to claim 1, wherein said second solder film is comprised of an alloy of 70% silver, 27% copper and 3% titanium.

4. A product according to claim 1, wherein said metal part is a metallic material selected from the group consisting of copper, inconel, molybdenum or a molybdenum alloy.

5. A product according to claim 4, wherein said metal part is a molybdenum alloy.

6. A product according to claim 5, wherein said molybdenum alloy is TZM, a high temperature molybdenum alloy with about 0.5% Ti, 0.08% Zr, 0.01–0.04% C and the balance molybdenum.

7. A process for soldering a pyrolytic graphite part and a metal part, to form a soldered product, comprising the steps of:
   (a) placing a first solder film on said metal part;
   (b) placing a carbon-fiber-reinforced graphite part on top of said first solder film;
   (c) placing a second solder film on said carbon fiber reinforced graphite part;
   (d) placing said pryolytic graphite part on said second solder film; and
   (e) soldering said first solder film, metal part, carbon-fiber-reinforced graphite part, second solder film and pyrolytic graphite part together, wherein said pyrolytic graphite and said carbon-fiber-reinforced graphite are positioned in relation to each other in such a way that stratification of said pyrolytic graphite runs parallel to the plane of primary orientation of carbon fibers within said carbon-fiber-reinforced graphite.

8. A process according to claim 7, wherein said first solder film comprises 70% by weight silver, 27% by weight copper and 3% by weight titanium.

9. A process according to claim 7, wherein said second solder film comprises 70% by weight silver, 27% by weight copper and 3% by weight titanium.

10. Process for the manufacture of a solder joint between a pyrolytic graphite part and a metal part, wherein the parts are not soldered directly to each other, but feature an intermedicate part made of carbon fiber-reinforced graphite, whereby the pyrolytic graphite and the carbon fiber-reinforced graphite are arranged in relation to each other so that the layers of the pyrolytic graphite run parallel to the primary plane of orientation of carbon fibers in the carbon-fiber reinforced graphite.

11. Process for the manufacture of a solder joint between a pyrolytic graphite part and a metal part according to claim 10, characterized in that the parts to be soldered are layered the one on top of the other with an intermediate solder film comprised of an alloy of 70% silver, 27% copper and 3% titanium, and soldered together under vacuum at a temperature of about 850° C.

* * * * *